United States Patent Office 3,828,021
Patented Aug. 6, 1974

3,828,021
GENTAMICIN C₁ DERIVATIVES
Thomas R. Beattie, North Plainfield, William V. Ruyle, Scotch Plains, Tsung-Ying Shen and Gordon L. Walford, Westfield, and Edward Walton, Scotch Plains, N.J., assignors to Merck & Co., Inc., Rahway, N.J.
No Drawing. Filed June 14, 1972, Ser. No. 262,821
Int. Cl. C07c *129/18*
U.S. Cl. 260—210 AB     20 Claims

ABSTRACT OF THE DISCLOSURE

New aminoglycoside antibiotics of the gentamicin family are described, having different functional groups on the C–2 position of the garosamine moiety. The compounds exhibit antibacterial activity against both gram-positive and gram-negative infections.

RELATIONSHIP TO THE PRIOR ART

Gentamicin is an antibiotic substance produced by fermentation of *Micromonospora purpurea* or *M. eichinospora* and variants thereof. It was first isolated and described in U.S. Pat. 3,091,572 (1963). It is a highly effective antibiotic active against both gram-positive and gram-negative microorganisms such as species of Staphlococcus Klebsiella, Pseudomonas, and Proteus. Three distinct but closely related chemical components have been separated and identified and are generally known as (gentamicin) $C_1$, $C_2$, or $C_{1a}$. (Another name for gentamicin $C_{1a}$ accepted by the art is gentamicin D.) The structure of these is as follows:

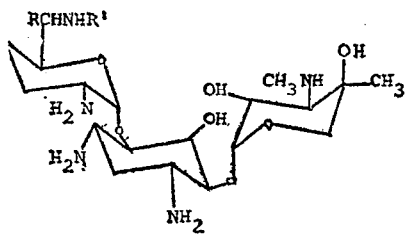

wherein in gentamicin $C_1$, $R=R'=CH_3$; in gentamicin $C_2$, $R=CH_3$ and $R'=H$; and in gentamicin $C_{1a}$, $R=R'=H$. The separation of these three components is described in U.S. Pat. 3,651,042 (1972).

The nomenclature of the above can be simplified by recognizing that each portion of the molecule is numbered and named. For instance, the following scheme may be used (the functional groups are removed to simplify the illustration):

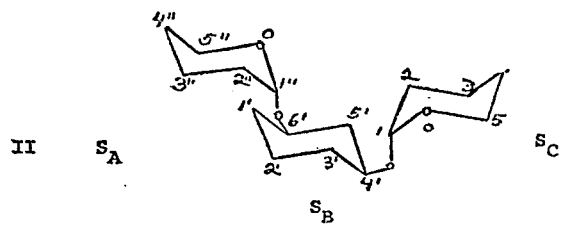

The three rings are called $S_A$, $S_B$, and $S_C$, respectively, with the numbering as indicated. The $S_B$ portion is also called the "deoxysteptamine" moiety. $S_C$ is also called "garosamine"; while $S_A$ and $S_B$ together are called "gentamine."

Gentamicin has been recognized since its commercial introduction (in 1969) as a highly effective antibiotic of great value in the treatment of infections. As with many antibiotics, however, extrachromosomal resistance to gentamicin can be induced *in vitro* by repeated subcultures in less than inhibitory concentrations of the antibiotic. Resistance to gentamicin has also been observed recently in the clinic. This chromosomal resistance is a relatively recently recognized phenomenon of bacteria, see Watanabe, T. (1963). "Infective heredity of multiple drug resistance in bacteria," *Bact. Rev.* 27: 87–115. The general phenomenon has been defined as "R-factors." Very generally, an R-factor is a biochemical capability of the bacteria to convert the antibiotic into a chemical derivative which does not interfere in the bacterial replication, thereby permitting bacterial growth. The clinical symptom of R-factor resistance is, of course, the failure of the patient to respond to the drug treatment. It is cautioned that the drug still is an active antibiotic, and as such continues to be useful in the war against disease. However, it is desirable to obtain a compound which has broad spectrum activity even against strains of organisms which exhibit resistance to gentamicin.

OBJECTS OF THE INVENTION

In summary, this invention provides novel derivatives of gentamicin which exhibit a highly comprehensive activity spectrum against gram-positive and gram-negative infections, including certain organisms which are resistant to gentamicin. It is noted that each individual derivative would not necessarily have an identical activity spectrum to the others, but each does possess activity as well as advantages over one or more of the parent gentamicins.

These derivatives which do demonstrate such superior activity are those which (a) contain the following functional groups in place of the C–2 hydroxyl group of the garosamine sugar, or (b) contain the following functional groups in place of the C–5′ hydroxyl group of the $S_B$ sugar; (the compound numbers refer to the structures *infra*), see the Flow Sheets following:

TABLE I

| | Compound | At Position 2 |
|---|---|---|
| IV | 2-O-loweralkyl wherein $R_1$ is loweralkyl having 1–6 carbon atoms. | —O$R_1$ |
| V | 2-O-loweralkyl carbamyl or 2-O-carbamyl (R can be hydrogen or loweralkyl having 1–6 carbon atoms, or loweralkenyl having 2–6 carbon atoms). | OH<br>‖<br>—OCN—R |
| VI | 2-keto | =O |
| VII | 2-epi-hydroxy | —OH |
| X | 2-epi-methanesulfonyloxy | —OSO₂CH₃ |
| XI | 2-deoxy | —H |
| VIII | 2-amino | —NH₂ |
| IX | 2-epi-amino | —NH₂ |

TABLE II

| | Compound | At Position 5′ |
|---|---|---|
| XII | 5′-O-loweralkyl wherein R is loweralkyl having 1–6 carbon atoms. | —O$R_1$ |
| XIII | 5′-O-carbamyl or 5′-O-loweralkyl carbamyl (R can be hydrogen or loweralkyl having 1–6 carbon atoms or loweralkenyl having 2–6 carbon atoms). | O H<br>‖ <br>—O—C—N—R |
| XIV | 5′-O-methanesulfonyl | —OSO₂CH₃ |

In addition to the 2- or the 5′-substituted compounds IV–XIV described in Tables I and II, we have also prepared the 2,5′-disubstituted carbamoyl gentamicin, which is a valuable antibacterial compound.

The nomenclature is trivial; if the new derivative has the same configuration at C–2 or C–5′ as the original hydroxyl group on the gentamicin, no prefix is used; however, if opposite configuration arises at C–2 or C–5′, the product is designated epi-. The nomenclature is more fully understandable with reference to the following flow sheets.

It is noted that the flow sheets use gentamicin $C_1$ to illustrate the reactions. We intend that gentamicin $C_2$ and gentamicin $C_{1a}$ (gentamicin $C_D$) be covered by the flow sheet also. In addition, the products IV-XIV all have the same structural substituents as the starting material, gentamicin $C_1$ penta-N-carbobenzoxy derivative except as indicated in the C-2 or C-5' positions of the sugar rings $S_C$ or $S_B$, respectively.

The compounds described in Tables I and II can be prepared using the following general processes. Reference can be made to the four Flow Sheets.

FLOW SHEET 1

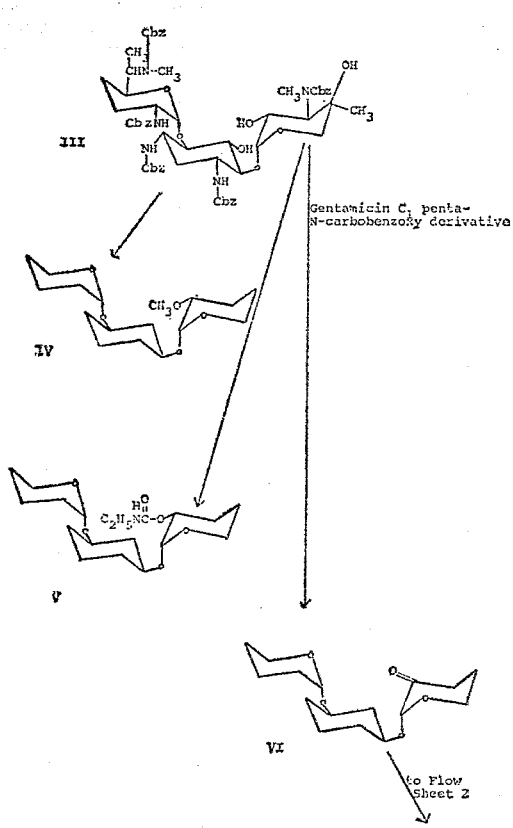

FLOW SHEET 2

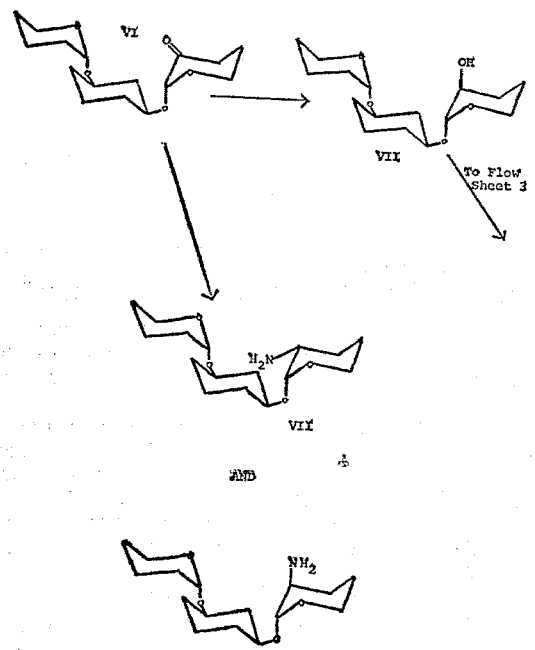

FLOW SHEET 3

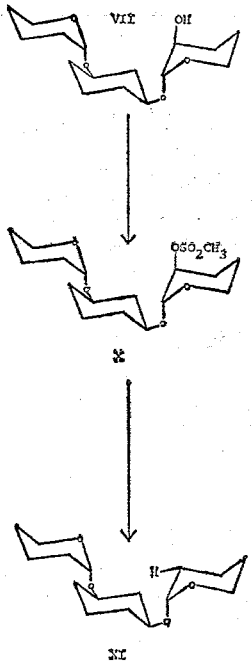

FLOW SHEET 4

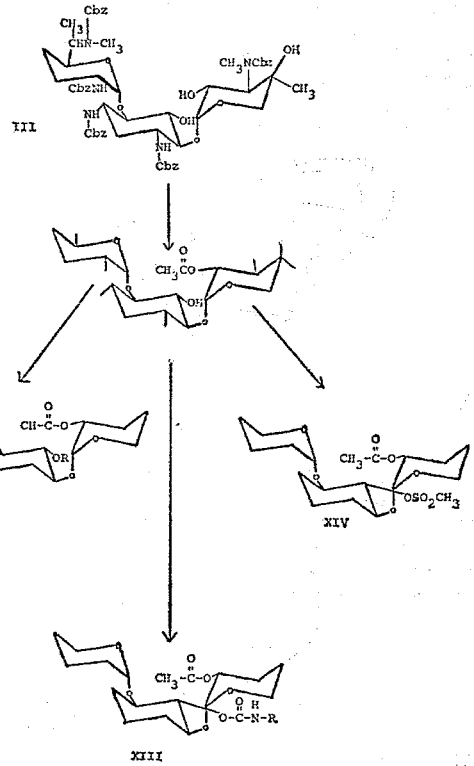

The four flow sheets illustrate the general synthesis of the active compounds of Table I. The blocking groups can be removed as a last step to yield the gentamicin having the derived functional group at C-2 or C-5'.

PREFERRED EMBODIMENTS OF THE INVENTION

The compounds of this invention can be prepared using the following reaction conditions.

The starting material for any of the reactions can be gentamicin $C_1$, $C_2$, or $C_{1a}$. In any case, the free amino groups are first blocked by reacting the desired component with a reagent capable of substituting an inert functionality onto the free hydrogens of the five amino groups. A suitable reagent is carbobenzoxy chloride; however, acetic anhydride can also be used. The gentamicin and the blocking reagent are stirred together, preferably at a temperature of −10° C. to 25° C. After purification and isolation using chromatographic techniques, the blocked gentamicin is recovered as a granular solid. Hereafter, the term "blocked gentamicin" will be used to refer to the key intermediate III, on which most reactions depend, but is understood to refer to each component of gentamicin $C_1$, $C_2$, and $C_{1a}$. Although the discussion herein refers to "active compounds," it is noted that by use of this term we refer to a final substituted gentamicin from which the blocking groups have been removed. The removal of blocking groups is a last step reaction, employing a catalytic reduction using hydrogen over a 10% palladium/carbon catalyst, in the case of the carbobenzoxy group; or alkaline hydrolysis in the case of the acetyl group. In the latter case, either a catalytic amount of sodium methoxide in methanol or barium hydroxide in water can be used, or similar reagents.

The next general step in the sequences of Flow Sheets 1–3 involves the reaction at the unblocked C–2 hydroxyl functionality. Although there are two other hydroxyl groups on the gentamicin, these do not participate in the reaction. The C–5 hydroxyl on $S_B$ is sterically hindered by the $S_A$/$S_C$ rings, while the C–4 hydroxyl on $S_C$, due to being tertiary, is not strongly reactive.

However, for the purposes of Flow Sheet 4 from Table II, the C–2 hydroxy group is blocked by the formation of a loweralkyl ester or loweralkyl ether derivative where loweralkyl means 1–6 carbon atoms. For example, an acetate group using acetyl chloride, acetic anhydride, or the like can be employed. As is evident, the C–5' hydroxy group does not normally participate in the reactions outlined in Flow Sheets 1–3 due to the steric hindrance of the two $S_A$ and $S_C$ rings. However, if the C–2–OH is blocked and the reaction times increased five to fifty-fold, then the C–5–OH moiety will react as desired. Preparative thin-layer chromatography will be used to separate and isolate the desired product. The two different types of blocking groups will then be removed, first the group at the C–2 hydroxyl, then the groups at the amino functionalities using standard techniques to yield the desired products. Therefore, the general description of the process is applicable to the C–5 hydroxyl modifications in Table II.

The 2-O-loweralkyl group can be substituted on the blocked gentamicin by reacting with a loweralkyl halide, preferably methyl iodide in an organic solvent. It may be desirable to use diazo methane to prepare the 2-O-methyl derivative. The reaction proceeds best under anhydrous conditions at a temperature of 25–50° C. for a reaction time of ½ to 12 hours. This group is illustrated as Compound IV in Flow Sheet 1. The products are separated by chromatographic techniques. Not only is the 2 - O-loweralkyl compound formed by this procedure, but also the 2,5'-di-O-loweralkyl - 3,4-$N_1$O - carbonyl-tetracarbobenzoxy derivative. This latter product can be separated from the simple loweralkyl compound and is also active as an antibacterial agent. As noted, this procedure is also applicable to the 5'-O-loweralkyl containing compounds XII.

The 2 - O - loweralkyl or 2 - O-loweralkenyl-carbamyl group, Compound V, Flow Sheet I, is prepared by the reaction of loweralkyl isocyanate or loweralkenyl isocyanate and the blocked gentamicin. The 2 - O - carbamyl group (also Compound V) is prepared by reaction of approximately equimolar amounts of trichloroethoxy carbonyl isocyanate and the blocked gentamicin. This results in the preparation of an intermediate compound having a trichloroethoxycarbonylcarbamoyl group at C–2. The blocking group can be removed with zinc dust in hot methanol to afford the desired 2 - deoxy - 2 - carbamoyl group. If desired, reaction conditions can be adjusted to remove the blocking groups at the same time as the cleaving of the trichloroethoxycarbonyl group. The desired product is eluted using ethyl acetate/chloroform; 3/1 on a silica gel plate. The fraction containing product is identified by its fluorescence under ultra-violet light. It is physically removed from the plate with a suitable organic solvent and obtained as a solid by evaporation of solvent. Both these procedures are applicable to the preparation of Compound XIII in the 5'-substituted series. It will also be obvious to one skilled in the art that the 2,5'-disubstituted carbamoyl compounds can be prepared by increasing the length of the reaction time and doubling the quantity of trichloroethoxycarbonyl isocyanate. The course of reaction is monitored by thin-layer chromatography.

Compound VI, Flow Sheet 1, is a valuable compound in its own right, and as it can be used to prepare other active compounds VII, VIII, IX, X, and XI, as described in Flow Sheets 2 and 3. This compound VI, the 2-keto derivative, is prepared by oxidizing the blocked gentamicin. Suitably, chromium trioxide-pyridine complex is used in an organic solvent such as methylene chloride. The oxidation proceeds rapidly at ambient temperatures. The residue, after solvent removal, is chromatographed and separated into fractions. The 2-keto fraction can then be purified.

The 2-amino and 2-epi-amino compounds, VIII and IX, Flow Sheet 2, are prepared by first reacting freshly prepared hydroxylamine with the 2-keto gentamicin VI. The 2-oximino intermediate thereby prepared is then reduced using a sodium metal reduction in anhydrous solvent. Both amino isomers are prepared and are separated and purified using preparative thin-layer chromatography.

The 2-epi-hydroxy derivative VII is useful per se, and also in preparing additional compounds X and XI in Flow Sheet 3. The 2-epi-hydroxy derivative itself is prepared from the 2-keto compound VI by sodium borohydride reduction in alcohol and dimethyl formamide. This reduction is not stereospecific, so that both the desired 2-epi-hydroxy gentamicin and the starting gentamicin are produced. The two isomers are separated by thin-layer chromatography, and the desired 2-epi-hydroxy compound isolated.

The 2-epi-methanesulfonyloxy derivative X is prepared from the 2-epi-hydroxy compound VII by reacting the latter with methanesulfonyl chloride in a solvent, such as pyridine. After a relatively brief reaction time, generally less than two days, the product is separated preparative thin-layer chromatography.

The preparation of the 5'-methanesulfonyl derivative XIV uses similar reagents to the above procedure. It is first noted that the configuration of the 5'-substituent in Compound XIV does not change during this reaction; therefore, the term "epi" is not employed. The preparation of Compound XIV can be briefly described as follows: following preparation of the penta-N blocked and 2-blocked gentamicin, H is reacted in an inert solvent, such as pyridine, with a large excess of methane sulfonyl chloride. The reactants are then kept, operably at room temperature, for from 7–15 days to allow the reaction to proceed to completion. The reaction is monitored using thin-layer chromatography. Following isolation of the reaction product, the C–2 and the N-blocking groups are removed sequentially.

The 2-deoxy derivative XI is prepared by first reacting sodium benzyl mercaptide in ethanol at reflux with the 2-epi-methane sulfonyloxy compound X. The 2-benzylthio intermediate thereby prepared is then reduced, using Raney nickel and ethanol. The reaction mixture is stirred vigorously during reaction, generally between 2–15 hours. The reaction is monitored by subjecting samples to thin-layer chromatography during the course of reaction. When reaction is complete, the product, the 2-deoxy compound XI, is recovered using preparative thin-layer chromatography.

As was mentioned supra, compounds IV through XI are blocked gentamicins. After removal of the blocking group by catalytic hydrogenation, the final products are isolated.

The compounds of this invention are all useful as antibacterial agents. They possess broad-spectrum activity against diseases caused by species of *Proteus, Pseudomonas, Staphylococcus, Klebsiella,* and *Enterobacter,* particularly *Staphylococcus aureas, Klebsiella,* and *E. coli.* For example, a chronic infection caused by *Proteus* can be efficaciously treated at a dose level of 1 mg./kg./body weight administered three times a day.

In addition, the compounds of this invention show antiviral activity against *Rickettsia akari.*

For administration to patients, the antibiotics are used in the usual modes for administration using normal procedures. Unit dosage forms can be prepared using pharmaceutically acceptable carriers. The compounds can be employed as described above or in a salt form such as the sulfate. It is most desirable to administer the drugs in injection form; an injectable solution can be easily prepared using 50 g. of compound in sterile solution to a volume of 1.0 liter. The compounds can also be prepared for use in topical ointments or opthalmalic drops.

This invention is further illustrated by the following examples.

EXAMPLE 1

Gentamicin $C_1$ Penta-N-Carbobenzoxy Derivative

A mixture of gentamicin $C_1$ (954 mg.), sodium carbonate (1.06 g.), 12 ml. water and 36 ml. acetone is cooled to $-5°$ C. Carbobenzoxy chloride (1.96 g.) is added with stirring during 5 minutes. The mixture is stirred in an ice bath for three hours and at 22° C. for one hour. The mixture is poured into 150 ml. cold water, and extracted with 2× 25 ml. ethyl acetate. The ethyl acetate solution is dried over magnesium sulfate, concentrated to a glass, and triturated in hexane to give 2.10 g. (91%) of granular solid, M.P. 85–95° C.

Anal. Calcd. for $C_{61}M_{73}N_5O_{17}$: C, 63.81, M, 6.41; N, 6.10. Found: C, 63.92; M, 6,26; N, 5.93.

This procedure can also be employed to yield the analogous gentamicin $C_2$ or $C_{1a}$ derivatives.

EXAMPLE 2

Gentamicin $C_{1a}$ Penta-N-Acetyl Derivative

A solution of 1 g. gentamicin $C_{1a}$, 20 ml. acetic anhydride, and 25 ml. methanol is stirred at 22° C. for 2.5 hours. The reaction solution is evaporated and the residue is chromatographed on Baker silica gel using chloroform and chloroform-methanol mixtures as eluants. The desired product, gentamicin $C_{1a}$ penta-N-acetyl, is obtained as an amorphous solid, 1.15 g., 78% yield.

This procedure can also be employed using gentamicin $C_2$ or gentamicin $C_1$.

EXAMPLE 3

Gentamicin $C_1$ Penta-N-Carbobenzoxy-2-O-Methyl Derivative

A mixture of 0.3 g. gentamicin $C_1$ penta-N-carbobenzoxy derivative, prepared as in Example 1 (or the analogous gentamicin $C_2$ or $C_{1a}$ derivatives), 0.6 g. anhydrous barium oxide, 0.9 ml. methyl iodide and 3 ml. dimethylformamide is stirred at 50° C. for 3 hours while protected with a Drierite tube. The mixture is filtered and the filtrate is lyophilized. The residue is chromatographed on 25 g. silica gel (Baker) using ethyl aceate/chloroform; 3/1 as eluant to afford the gentamicin $C_1$ penta-N-carbobenzoxy-2-O-methyl derivative and the 2,5'-di-O-methyl-3,4 - N,O - carbonyltetracarbobenzoxy derivative. In the same manner, the analogous lower alkoxy derivatives can be prepared using the desired loweralkyl halide.

The 2-O-methyl derivative can be also made by the use of the following process: A solution of 0.3 g. gentamicin $C_1$ penta-N-carbobenzoxy derivative, 30 ml. of dimethoxyethane and 10 ml. water is heated at 80° C. Diazomethane (~5 g.) in ether solution is added dropwise with vigorous stirring as the ether is allowed to distill from the reaction mixture. After completion of addition, the reaction mixture is evaporated under reduced pressure to remove most of the dimethoxyethane. The residue is extracted with chloroform, and the extract is dried with magnesium sulfate and evaporated. Chromatography on Baker silica gel using mixtures of chloroform and ethyl acetate separates the desired O-methyl derivative from unreacted starting material.

EXAMPLE 4

Gentamicin $C_2$ Penta-N-Carbobenzoxy-2-O-Methylcarbamyl Derivative

A solution of 100 mg. gentamicin $C_2$ penta-N-carbobenzoxy derivative, prepared as in Example 1, 100 µl. methyl isocyanate, 6 µl. triethylamine and 3 ml. of chloroform is heated in a sealed tube at 60° C. for 3 days. The reaction mixture is evaporated under reduced pressure and the residue is placed on an 8" x 8" silica gel G chromatography plate using methylene chloride. The plate is eluted with ethyl acetate/chloroform: 3/1. The area which fluoresces under ultraviolet light is scraped off and eluted with ethyl acetate. Evaporation affords gentamicin $C_2$ penta-N - carbobenzoxy - 2- O - methylcarbamyl derivative, 89 mg.

The analogous loweralkyl carbamyl derivatives can be prepared in a similar manner using the desired loweralkylisocyanate. Also, loweralkenyl carbamates can be prepared, e.g., gentamicin $C_2$ penta-N-carbobenzoxy-2-O-allylcarbamate, using the reaction scheme above with allylisocyanate as the reagent.

EXAMPLE 5

Gentamicin $C_{1a}$ Penta-N-Carbobenzoxy-2-O-Trichloroethoxy-Carbonylcarbamyl Derivative To 200 mg. of gentamicin $C_{1a}$ penta-N-carbobenzoxy derivative (prepared as in Example 1) in 4 ml. benzene is added 50 µl. of trichloroethoxycarbonyl isocyanate. After stirring at 220° C. for 2.5 hours, thin-layer chromatographic monitoring indicates reaction is about ⅔ complete. Addition of additional 10 µl. trichloroethoxycarbonyl isocyanate with stirring for 1.0 hour completes the reaction.

The reaction mixture is evaporated under reduced pressure and chromatographed on 25 g. Baker silica gel using ethyl acetate/chloroform: ½ as eluant. With collection of 50 ml. fractions the product is found in fractions 10 to 18. Combination of these fractions affords 127 mg. of the desired product, identified by elemental analysis as the gentamicin $C_{1a}$ penta-N-carbobenzoxy-2 - O - trichloroethoxycarbonylcarbamyl derivative.

EXAMPLE 6

Gentamicin $C_{1a}$ 2-Carbamyl Derivative

A mixture of 80 mg. of gentamicin $C_{1a}$ penta-N-carbobenzoxy-2-O-trichloroethoxycarbonylcarbamyl derivative, 6 ml. dioxane, 4 ml. water, 5 drops acetic acid, and 80 mg. 10% palladium on charcoal is reduced catalytically at 22° C. and atmospheric pressure for 3 hours. The reaction mixture is filtered to remove catalyst, and the filtrate is lyophilized to afford 43 mg. of crude product. Preparative thin-layer chromatography on silica gel G with MeOH/CHCl$_3$/conc. ammonia: 2/1/1 (lower phase) as eluant affords the product in 21 mg. yield. The product is identified by TLC, IR and mass spectrum as gentamicin $C_{1a}$2-carbamyl derivative.

EXAMPLE 7

Gentamicin $C_{1a}$ 2,5'-Di-O-Carbamyl Derivative

When the processes of Examples 5 and 6 are repeated, except that twice the quantity of trichloroethoxy carbonyl isocyanate is used in the reaction of Example 5, the major product isolated is the gentamicin $C_{1a}$ penta-N-carbobenzoxy-2,5' - di - O - trichloroethoxycarbonylcarbamyl derivative, 150 mg. When this latter is reduced using the process of Example 5, 70 mg. of the product, the gentamicin $C_{1a}$ 2,5'-di-O-carbamyl derivative is obtained. Identity of the product is confirmed using infra red and mass spectrophotoometric analysis.

The gentamicin $C_1$ and gentamicin $C_2$ 2,5'-di-O-carbamyl derivatives can also be made using this process (yields, respectively, are 75 mg. and 70 mg.).

EXAMPLE 8

Gentamicin $C_1$ Penta-N-Carbobenzoxy-2-Keto Derivative

An oxidizing solution of 0.6 g. chromium trioxide, 0.97 ml. pyridine and 15 ml. of methylene chloride is prepared. To a solution of 0.3 g. of gentamicin $C_1$ penta-N-carbobenzoxy derivative in 5 ml. of methylene chloride is added 5 ml. of the oxidizing solution. After stirring for one hour, the mixture is filtered and the filtrate evaporated under reduced pressure. The residue is chromatographed on 25 g. of Baker silica gel using EtOAc/CHCl$_3$: 1/1 as eluant. Evaporation of appropriate fractions affords gentamicin $C_1$ penta-N - carbobenzoxy - 2 - keto derivative.

EXAMPLE 9

Gentamicin $C_1$ Penta-N-Carbobenzoxy-2-epi Derivative

To a solution of 0.10 g. of gentamicin $C_1$ penta-N-carbobenzoxy-2-keto derivative in 1 ml. of N,N-dimethylformamide and 15 ml. of methanol is added sodium borohydride (100 mg. portion wise). After 2 hours at 22° C., the mixture is heated quickly to reflux and cooled. Evaporation under reduced pressure affords a residue to which 3 ml. of water is added. Extraction of this mixture with chloroform (4× 5 ml.), drying of the chloroform with magnesium sulfate, and evaporation gives a residue. The residue is chromatographed on 25 g. silica gel G using ethylacetate/chloroform as eluant to give both gentamicin $C_1$ penta-N-carbobenzoxy derivative and its epimer at C-2.

EXAMPLE 10

Gentamicin $C_1$ Penta-N-Carbobenzoxy-2-Deoxy-2-Epi-Methanesulfonyloxy Derivative A mixture of 0.1 g. gentamicin $C_1$ penta-N-carbobenzoxy-2-epi derivative, 40 ml. methanesulfonyl chloride and 2 ml. pyridine is stirred at 22° C. for 2 hours. The mixture is evaporated under reduced pressure and the residue is subjected to preparative thin-layer chromatography on an 8" x 8" silica gel G plate using ethylacetate/ chloroform: 3/1 as eluant. The area which fluoresces under ultraviolet light is scraped off and eluted with ethylacetate, which on evaporation affords gentamicin $C_1$ penta-N-carbobenzoxy - 2 - deoxy-2-epi-methanesulfonyloxy derivative.

EXAMPLE 11

Gentamicin $C_1$ Penta-N-Carbobenzoxy-2-Deoxy Derivative

A solution of 0.1 g. gentamicin $C_1$ penta-N-carbobenzoxy-2-deoxy - 2 - epi-methanesulfonyloxy derivative, 0.1 g. sodium benzylmercaptide and 15 ml. of ethanol is refluxed for 10 hours. The solution is evaporated, and the residue is put on an 8" x 8" silica gel G thin-layer chromatography plate and developed with ethyl acetate/chloroform: 3/1. The area which fluoresces under ultraviolet light is scraped off and eluted with ethylacetate. Evaporation provides gentamicin $C_1$ penta-N-carbobenzoxy-2-deoxy-2-benzylthio derivative, which is not further characterized, but used directly in the next step.

A mixture of 0.1 g. gentamicin $C_1$ penta-N-carbobenzoxy-2-deoxy-2-benzylthio derivative, 2 g. of Raney nickel, and 15 ml. of ethanol is stirred vigorously at 22° C. Progress of the reaction is followed by thin-layer chromatography on silica gel G and ethyl acetate/chloroform: 3/1 as eluant. When reaction is complete, the mixture is filtered and the filtrate is evaporated under reduced pressure. The residue is subjected to preparative thin-layer chromatography on an 8" x 8" silica gel G thin-layer chromatography plate developed with ethylacetate/chloroform: 3/1. The area which fluoresces under ultraviolet light is scraped off and eluted with ethylacetate. Evaporation provides gentamicin $C_1$ penta-N-carbobenzoxy-2-deoxy derivative.

EXAMPLE 12

Gentamicin $C_1$ Penta-N-Carbobenzoxy-2-Deoxy-2-Amino Derivative and Gentamicin $C_1$ Penta-N-Carbobenzoxy-2-Deoxy-2-Epi-Amino Derivative A solution of 0.2 g. gentamicin $C_1$ penta-N-carbobenzoxy-2-keto derivative in 5 ml. ethanol is treated with one molar equivalent of freshly prepared hydroxylamine in ethanol. The solution is stirred for three hours at 22° C. and evaporated under reduced pressure. Treatment of the residue by preparative thin-layer chromatography as in Example 9 affords gentamicin $C_1$ penta-N-carbobenzoxy-2-deoxy-2-oximino derivative, which is not further characterized but used directly in the next step.

A solution of 0.2 g. gentamicin $C_1$ penta-N-carbobenzoxy-2-deoxy-2-oximino derivative in 10 ml. anhydrous ethanol is heated at reflux and 0.4 g. sodium is added gradually in small pieces during 15 minutes. The reaction mixture is cooled to room temperature and water is added cautiously. The mixture is evaporated under reduced pressure and the residue is treated as in Example 9 by preparative thin-layer chromatography to afford gentamicin $C_1$ penta-N-carbobenzoxy-2-deoxy-2-amino derivative and gentamicin $C_1$ penta-N-carbobenzoxy-2-deoxy-2-epi-amino derivative.

EXAMPLE 13

Gentamicin $C_{1a}$ Penta-N-Acetyl-2-O-Acetyl Derivative

A solution of 202 mg. of the gentamicin $C_{1a}$ penta-N-acetyl derivative prepared as in Example 2 in 4 ml. pyridine containing 0.5 ml. acetic anhydride is kept at 22° C. for 2 days. The reaction mixture is then evaporated to dryness. The solid is chromatographed on silica gel using chloroform methanol mixtures as eluants to give 199 mg. of product, the gentamicin $C_{1a}$ penta-N-acetyl-2-O-acetyl derivative, identified by IR and mass spectraphotometric techniques.

EXAMPLE 14

Gentamicin $C_2$ Penta-N-Carbobenzoxy-2-O-Acetyl Derivative

An ice-cold solution of penta-N-carbobenzoxygentamicin $C_2$ (5.10 g., 4.5 mmoles) prepared as in Example 1, in anhydrous pyridine (45 ml.) is treated with acetyl chloride (0.64 ml., 2 equiv.). The ice-bath is not replenished and the reaction mixture is stirred at room temperature for 16 hours.

Water (0.5 ml.) is added, and after being stirred for 1 hour at room temperature, the reaction mixture is evaporated to dryness *in vacuo*. Trituration of the residue with cold water affords the gentamicin $C_2$ penta-N-carbobenzoxy-2-O-acetyl derivative as a white, amorphous solid, homogeneous by TLC, $R_f$ 0.39 (CHCl$_3$/EtOAc 1:1 v./v.). The yield is quantitative.

EXAMPLE 15

Gentamicin $C_{1a}$ Penta-N-Acetyl-2-O-Acetyl-5'-O-Methyl Derivative

To a solution of 84 mg. gentamicin $C_{1a}$ penta-N-acetyl-2-O-acetyl derivative in 2 ml. dimethylformamide is added 15 ml. thallous ethoxide and 50 drops of methyl iodide. After 2 hours at 22° C., the sample is evaporated under reduced pressure to give 120 mg. of crude product, gentamicin $C_{1a}$ penta-N-acetyl-2-O-acetyl-5'-O-methyl derivative.

The analogous loweralkyl derivatives can be prepared in a similar manner by using the desired loweralkyl iodide or halide in the above procedure.

EXAMPLE 16

Gentamicin $C_{1a}$ 5'-O-Methyl Derivative

The compound prepared in Example 15, the gentamicin $C_{1a}$ penta-N-acetyl-2-O-acetyl-5'-O-methyl derivative (120 mg.) is mixed with 658 mg. barium hydroxide octahydrate, 4 ml. water, and heated in an oil bath at 100–110° C. for 32 hours and at 22° C. for 55 hours.

To the reaction mixture is added 0.1 ml. conc. sulfuric acid and the pH is adjusted to 2 with dilute sulfuric acid. The precipitate is removed by centrifugation and the filtrate is lyophilized to afford 110 mg. crude product. Preparative TLC on silica gel G using $CHCl_3$/MeOH/Conc. $NH_3$: 2/1/1 (lower phase) as eluant affords 7.5 mg. of desired gentamicin $C_{1a}$ 5'-O-methyl derivative, identified by mass spectroscopy and $R_f$ value on TLC (above 2:1:1 system, silica gel G, product has $R_f$ of 0.27 compared to 0.23 for gentamicin $C_{1a}$).

The other 5-O'-loweralkyl derivatives are analogously prepared.

EXAMPLE 17

Gentamicin $C_2$ Penta-N-Carbobenzoxy-2-O-Acetyl-5'-O-Carbamyl Derivative

A solution of gentamicin $C_2$ penta-N-carbobenzoxy-2-O-acetyl prepared as in Example 14 (3.53 g., 3.0 mmoles) in dry benzene (75 ml.) is treated with trichloroethoxycarbonyl isocyanate (0.47 ml., 15% excess) and the mixture is stirred at room temperature for 24 hours.

Excess reagent is destroyed by addition of methanol (1 ml.), and the reaction mixture is evaporated to dryness in vacuo. The product (4.2 g.) is a yellow oil, by TLC a complex mixture, the major component of which is penta-N-carbobenzoxy-gentamicin $C_2$ 2-O-acetyl-5'-O-trichloroethoxycarbonyl carbamyl, $R_f$ 0.48 ($CHCl_3$/EtOAc 1:1 v./v.), which is employed directly in the next step.

Crude penta-N-carbobenzoxy gentamicin $C_2$ 2-O-acetyl-5'-O-trichloroethoxycarbonyl carbamyl (4.73 g., 3.4 mmoles) is dissolved in glacial acetic acid (200 ml.), zinc dust (18.9 g.) is added, and the mixture is stirred vigorously for 3 hours at room temperature.

The mixture is filtered, and the collected solid is washed with several portions of acetic acid. Evaporation of the combined filtrate and washings affords a colorless oil (ca. 5 g.). The major component of this oil is identified as penta-N-carbobenzoxy gentamicin $C_2$ 2-O-acetyl-5'-O-carbamyl, $R_f$ 0.43 (EtOAc/$CHCl_3$ 3:1 v./v.).

The major product is isolated by chromatography on a column of silica gel (250 g.) using ethyl acetate/chloroform )3:1 v./v.) as developer/eluant. Evaporation of appropriate fractions gives penta-N-carbobenzoxy gentamicin $C_2$ 2-O-acetyl-5'-O-carbamyl (2.04 g., 49%) as a colorless glassy solid.

EXAMPLE 18

Gentamicin $C_2$ Penta-N-Carbobenzoxy-5'-O-Carbamyl Derivative

A small cube of sodium metal is dissolved in dry methanol (50 ml.), and to the solution is added penta-N-carbobenyoxy gentamicin $C_2$ 2-O-acetyl-5-O-carbamyl (1.97 g., 1.6 mmoles). After being allowed to stand for 2.5 hours at room temperature, the solution is evaporated carefully in vacuo to give a pale yellow foam (ca. 2 g.). The desired product, penta-N-carbobenzoxy gentamicin $C_2$ 5'-O-carbamyl, $R_f$ 0.20 (ethylacetate/chloroform 3:1 v./v.), is separated by chromatography on a silica gel (100 g.) column using EtOAc/$CHCl_3$ (3:1 v./v.) as developer/eluant. The product (990 mg., 52%) is obtained as a colorless glassy solid by combination and evaporation of appropriate chromatographic fractions.

EXAMPLE 19

Gentamicin $C_2$ Penta-N-Carbobenzoxy-2-O-Acetyl-5'-O-Ethylcarbamyl Derivative A solution of 100 mg. gentamicin $C_2$ penta-N-carbobenzoxy-2-O-acetyl derivative, prepared as in Example 14, 100 ml. ethyl isocyanate, 6 $\mu$l. triethylamine, and 3 ml. of chloroform is heated in a sealed tube at 60° C. for 15 days. The mixture is evaporated under reduced pressure and the residue is placed on an 8" x 8" silica gel G chromatography plate using methylene chloride. The plate is eluted with ethylacetate/chloroform: 3/1. The area which fluoresces under ultraviolet light is scraped off and eluted with ethylacetate. Evaporation affords gentamicin $C_2$ penta - N - carbobenzoxy-2-O-acetyl-5'-O-ethylcarbamyl derivative. The analogous loweralkyl carbamyl derivatives can be prepared in a similar manner using the desired loweralkyl isocyanate.

EXAMPLE 20

Gentamicin $C_2$ Penta-N-Carbobenzoxy-5'-O-Ethylcarbamyl Derivative

A small cube of sodium metal is dissolved in dry methanol (50 ml.), and to the solution is added penta-N-carbobenzoxy gentamicin $C_2$ 2-O-acetyl-5'-O-ethylcarbamyl (1.5 g.). After being allowed to stand for 2.5 hours at room temperature, the solution is evaporated carefully in vacuo to give a pale yellow foam. The desired product, penta-N-carbobenzoxy gentamicin $C_2$ 5'-O-ethylcarbamyl is separated by chromatography on a silica gel (100 g.) column using EtOAc/$CHCl_3$ (3:1 v./v.) as developer/eluant. The product, gentamicin $C_2$ penta-N-carbobenzoxy-5'-O-ethylcarbamyl derivative, is obtained as a non-crystalline solid by combination and evaporation of appropriate chromatographic fractions.

EXAMPLE 21

Gentamicin $C_2$ Penta-N-Carbobenzoxy-2-O-Acetyl-5'-O-Methanesulfonyl Derivative A mixture of 0.1 g. of bentamicin $C_2$ penta-N-carbobenzoxy-2-O-acetyl derivative prepared as in Example 14 is dissolved in 2 ml. pyridine containing 50 ml. methanesulfonyl chloride and stirred at room temperature. The reaction is allowed to proceed for 10 days. Monitoring of the reaction during this period by TLC indicates that the reaction is completed. The mixture is then evaporated under reduced pressure and the residue is subjected to preparative thin-layer chromatography on an 8" x 8" silica gel G plate using ethylacetate/chloroform: 3/1 as eluant. The area which fluoresces under ultraviolet light is scraped off and eluted with ethylacetate, which on evaporation affords gentamicin $C_2$ penta-N-carbobenzoxy-2-O-acetyl-5'-O-methanesulfonyl derivative.

EXAMPLE 22

Gentamicin $C_2$ Penta-N-Carbobenzoxy-5'-O-Methanesulfonyl Derivative

Following the same general procedure described in Example 20, gentamicin $C_2$ penta-N-carbobenzoxy-2-O-acetyl-5'-methanesulfonyloxy derivative is treated with sodium in methanol. The product, gentamicin penta-N-carbobenzoxy-5-methanesulfonyl derivative is separated using preparative thin-layer chromatography.

EXAMPLE 23

Removal of N-Carbobenzoxy Blocking Groups

The compounds prepared in Examples 3, 4, 8, 9, 10, 11, 12, 18, 20, and 22 are deblocked to remove the penta-N-carbobenzoxy groups. The following procedure is used; for illustrative purposes, the compounds of Examples 4 and 18 are mentioned specifically.

A. Gentamicin $C_2$ 2-O-methylcarbamyl derivative

A mixture of 45 mg. gentamicin $C_2$ penta-N-carbobenzoxy-2-O-methylcarbamate, 45 mg. 10% palladium on carbon, 4 ml. dioxane, 3.5 ml. water, and 2 drops acetic acid are hydrogenated at 22° C. and one atmosphere for 3 hours. The catalyst is removed by filtration and the residue is lyophilized to give 24 mg. crude product. The crude product is purified by preparative TLC on silica gel using $CHCl_3$/MeOH/Conc. $NH_3$: 2/1/1 (lower phase) as eluant. The purified product weighed 13 mg. and is identified by mass spectroscopy as gentamicin $C_2$ 2-O-methylcarbamyl derivative.

B. Gentamicin $C_2$ 5'-O-carbamyl derivative

Penta - N - carbobenzoxy gentamicin $C_2$ 5-O-carbamyl (616 mg., 0.52 mmole) is dissolved in a mixture of dioxane (15 ml.), water (12 ml.) and glacial acetic acid (10 drops), 10% palladium on charcoal catalyst (600 mg.) is added, and the mixture is hydrogenated at room temperature and atmospheric pressure for 3 hours.

The reaction mixture is filtered, and the filtrate is evaporated in vacuo affording a pale yellow oil (375 mg.). The crude product is chromatographed on a silica gel (70 g.) column using the lower phase of a $CHCl_3$/MeOH/conc. $NH_4OH$ (2:1:1 v./v.) solvent system as eluant. Evaporation of the appropriate chromatographic fractions gives gentamicin $C_2$ 5'-O-carbamyl (145 mg., 55%) as a white amorphous solid, homogeneous by TLC, $R_f$ 0.15 ($CHCl_3$/MeOH/$NH_4OH$ 2:1:1 v./v.—lower phase).

The following compounds can be prepared using the above procedures:

gentamicin $C_1$ 2-O-methyl
gentamicin $C_{1a}$ 2-O-ethyl
gentamicin $C_2$ 2-O-isopropyl
gentamicin $C_1$ 2-O-ethylcarbamyl
gentamicin $C_{1a}$ 2-O-n-allylcarbamyl
gentamicin $C_2$ 2-O-hexylcarbamyl
gentamicin $C_2$ 2-O-isopropylcarbamyl
gentamicin $C_2$ 2-O-ethylcarbamyl
gentamicin $C_2$ 2-O-methylcarbamyl
gentamicin $C_1$ 2-keto
gentamicin $C_{1a}$ 2-keto
gentamicin $C_2$ 2-keto
gentamicin $C_1$ 2-epi
gentamicin $C_{1a}$ 2-epi
gentamicin $C_1$ 2-deoxy-2-epi-methanesulfonyloxy
gentamicin $C_2$ 2-deoxy-2-epi-methanesulfonyloxy
gentamicin $C_1$ 2-deoxy
gentamicin $C_{1a}$ 2-deoxy
gentamicin $C_2$ 2-deoxy
gentamicin $C_1$ 2-deoxy-2-amino
gentamicin $C_{1a}$ 2-deoxy-2-amino
gentamicin $C_2$ 2-deoxy-2-amino
gentamicin $C_1$ 2-deoxy-2-epi-amino
gentamicin $C_{1a}$ 2-deoxy-2-epi-amino
gentamicin $C_2$ 2-deoxy-2-epi-amino
gentamicin $C_2$ 5'-O-carbamyl
gentamicin $C_1$ 5'-O-carbamyl
gentamicin $C_{1a}$ 5'-O-carbamyl
gentamicin $C_2$ 5'-O-ethylcarbamyl
gentamicin $C_{1a}$ 5'-O-methylcarbamyl
gentamicin $C_1$ 5'-O-methylcarbamyl
gentamicin $C_2$ 5'-O-methanesulfonyl
gentamicin $C_1$ 5'-O-methanesulfonyl

What is claimed is:

1. The compound selected from the group consisting of 2-substituted gentamicin $C_1$, gentamicin $C_{1a}$, gentamicin $C_2$, having the following structural formula:

wherein R' is methyl or hydrogen; R" is methyl or hydrogen except that R' is methyl only when R" is also methyl; and R''' is $$-OR,$$
$$-O-\overset{O}{\overset{\|}{C}}-\overset{H}{\overset{|}{N}}-R$$
$$=O$$
$$-OSO_2CH_3 \text{ or}$$
$$-NH_2$$

wherein $R_1$ is loweralkyl having 1–6 carbon atoms; R is hydrogen, loweralkyl having 1–6 carbon atoms, or loweralkenyl having 2–6 carbon atoms; and wherein the methanesulfonyloxy substituent is in the epi-steric position; and the amino substituent is in either the normal or epi-steric position.

2. The compound of Claim 1 wherein R''' is $$-OR_1 \text{ or}$$
$$-O-\overset{O}{\overset{\|}{C}}-\overset{H}{\overset{|}{N}}-R.$$

3. The compound of Claim 1 wherein R''' is $-OR_1$, where $R_1$ is loweralkyl of 1–6 carbon atoms.
4. The compound of Claim 3 wherein R''' is methoxy.
5. The compound of Claim 3 wherein R''' is ethoxy.
6. The compound of Claim 2 wherein R''' is $$-O-\overset{O}{\overset{\|}{C}}-\overset{H}{\overset{|}{N}}-R$$

wherein R is hydrogen, loweralkyl of 1–6 carbon atoms or loweralkenyl of 2–6 carbon atoms.

7. The compound of Claim 6 wherein R is hydrogen.
8. The compound of Claim 6 wherein R is methyl.
9. The compound of Claim 6 wherein R is ethyl.
10. The compound of Claim 6 wherein R is isopropyl.
11. The compound of Claim 6 wherein R is allyl.
12. The compound selected from the group consisting of 5'-substituted gentamicin $C_1$, gentamicin $C_{1a}$, or gentamicin $C_2$, having the following structural formula:

wherein R' is methyl or hydrogen; R" is methyl or hydrogen, except that R' is methyl only when R" is also methyl; and R''' is $$-OR,$$
$$-O-\overset{O}{\overset{\|}{C}}NHR \text{ or}$$
$$-OSO_2CH_3$$

wherein $R_1$ is loweralkyl having 1–6 carbon atoms, and R is hydrogen, loweralkyl having 1–6 carbon atoms or lower alkenyl having 2–6 carbon atoms.

13. The compound of Claim 12 wherein R''' is $OR_1$, $R_1$ being loweralkyl having 1–6 carbon atoms.
14. The compound of Claim 13 wherein $R_1$ is methyl.
15. The compound of Claim 12 wherein R''' is $$-O\overset{O}{\overset{\|}{C}}-\overset{H}{\overset{|}{N}}R$$

wherein R is hydrogen, loweralkyl having 1–6 carbon carbon atoms, or loweralkenyl having 2–6 carbon atoms.

16. The compound of Claim 15 wherein R is hydrogen.
17. The compound of Claim 15 wherein R is methyl.
18. The compound of Claim 15 wherein R is ethyl.

19. The compound selected from the group consisting of 2,5′-disubstituted gentamicin C gentamicin $C_{1a}$, or gentamicin $C_2$, having the following structural formula:

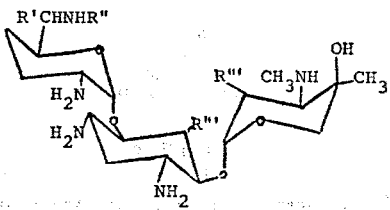

wherein R′ is methyl or hydrogen; R″ is methyl or hydrogen, except that R′ is methyl only when R″ is also methyl; and R‴ is

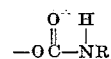

wherein R is hydrogen, loweralkyl having 1-6 carbon atoms, or lower alkenyl having 2-6 carbon atoms.

20. The compound of Claim 19 wherein R is hydrogen.

References Cited
UNITED STATES PATENTS 3,651,042   3/1972   Marquez et al. __ 260—210 AB JOHNNIE R. BROWN, Primary Examiner U.S. Cl. X.R.

260—210 R; 424—181

UNITED STATES PATENT OFFICE
CERTIFICATE OF CORRECTION

Patent No. 3,828,021              Dated August 6, 1974

Inventor(s) Thomas R. Beattie et al.

It is certified that error appears in the above-identified patent and that said Letters Patent are hereby corrected as shown below:

In the specification, at Column 1, Line 8, after Serial No. 262,821, insert the phrase:

-- claims priority, application Great Britain, Serial No. 33,583, filed July 16, 1971 and Serial No. 33,583, filed June 2, 1972 --

UNITED STATES PATENT OFFICE
CERTIFICATE OF CORRECTION

Patent No. 3,828,021  Dated August 6, 1974

Page - 2

Inventor(s) THOMAS R. BEATTIE, et al.

It is certified that error appears in the above-identified patent and that said Letters Patent are hereby corrected as shown below:

In Claim 1, Column 14, line 9 should read as follows:

$-OSO_2CH_3$ or

In Claim 12, Column 14, line 59 should read as follows:

$-OSO_2CH_3$ or

Signed and sealed this 24th day of December 1974.

(SEAL)
Attest:

McCOY M. GIBSON JR.
Attesting Officer

C. MARSHALL DANN
Commissioner of Patents